Sept. 23, 1958 LE ROY C. MILLIKEN 2,853,188

SORTING MACHINES

Filed June 30, 1954 13 Sheets-Sheet 1

INVENTOR.
LeRoy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 2

INVENTOR.

LeRoy C. Milliken,

BY Paul & Paul

ATTORNEYS.

SORTING MACHINES

Filed June 30, 1954 13 Sheets-Sheet 3

INVENTOR.
LeRoy C. Milliken,
BY Paul & Paul
ATTORNEYS.

INVENTOR.
LeRoy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 5

INVENTOR.
LeRoy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 6

INVENTOR.
LeRoy C. Milliken,
BY Paul & Paul
ATTORNEYS.

INVENTOR.
LeRoy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 8

INVENTOR.

LeRoy C. Milliken,

BY Paul & Paul

ATTORNEYS.

Sept. 23, 1958 LE ROY C. MILLIKEN 2,853,188

SORTING MACHINES

Filed June 30, 1954 13 Sheets-Sheet 9

INVENTOR.
LeRoy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 10

INVENTOR.
Le Roy C. Milliken,
BY Paul & Paul
ATTORNEYS.

INVENTOR.
Le Roy C. Milliken,
BY Paul & Paul
ATTORNEYS.

Sept. 23, 1958 LE ROY C. MILLIKEN 2,853,188

SORTING MACHINES

Filed June 30, 1954 13 Sheets-Sheet 12

INVENTOR.

LeRoy C. Milliken,

BY Paul & Paul

ATTORNEYS.

SORTING MACHINES

Filed June 30, 1954 13 Sheets-Sheet 13

INVENTOR.
Le Roy C. Milliken,
BY Paul & Paul
ATTORNEYS.

United States Patent Office 2,853,188

Patented Sept. 23, 1958

2,853,188

SORTING MACHINES

Le Roy Crosby Milliken, Robesonia, Pa.

Application June 30, 1954, Serial No. 440,450

35 Claims. (Cl. 209—82)

This invention relates to machines for sorting articles such as stockings or the like, particularly long hose or ladies' stockings.

Due to inequalities in the yarns and variations in the tension to which they are subjected as they are fed to the needles of commercial knitting machines, ladies' stockings produced by such machines vary very considerably in proportions especially from the standpoint of length and the height of heel reinforcements. The differences become even more pronounced as a consequence of frequent handling of the stockings in the finishing operations of toe closing, seaming, pre-boarding, dyeing and final boarding. It is therefore necessary to match the stockings, i. e., to "pair" them in preparation for marketing. Pairing of the stockings by hand, as has been the general practice heretofore, is not only tedious and time consuming, but entails employment of experienced help at high pay which adds very considerably to production costs.

The chief aim of my invention is to overcome the above mentioned drawbacks. This objection is attained in practice, as hereinafter more fully disclosed, through provision of a relatively simple reliable and efficient machine whereby stockings successively placed therein are sensed for length and/or heel proportioning and, in accordance with their lengths and/or heel proportioning, are automatically deposited into different collecting receptacles pre-assigned to receive them.

Other objects and attendant advantages will appear from the following detailed description of the attached drawings, wherein:

Figs. 1 and 2, taken together, show the side elevation of a stocking sorting machine conveniently embodying my invention, with portions thereof broken out and others in longitudinal section.

Figs. 3 and 4, taken together, show the machine in top plan, likewise with portions thereof broken out.

Figure 1:
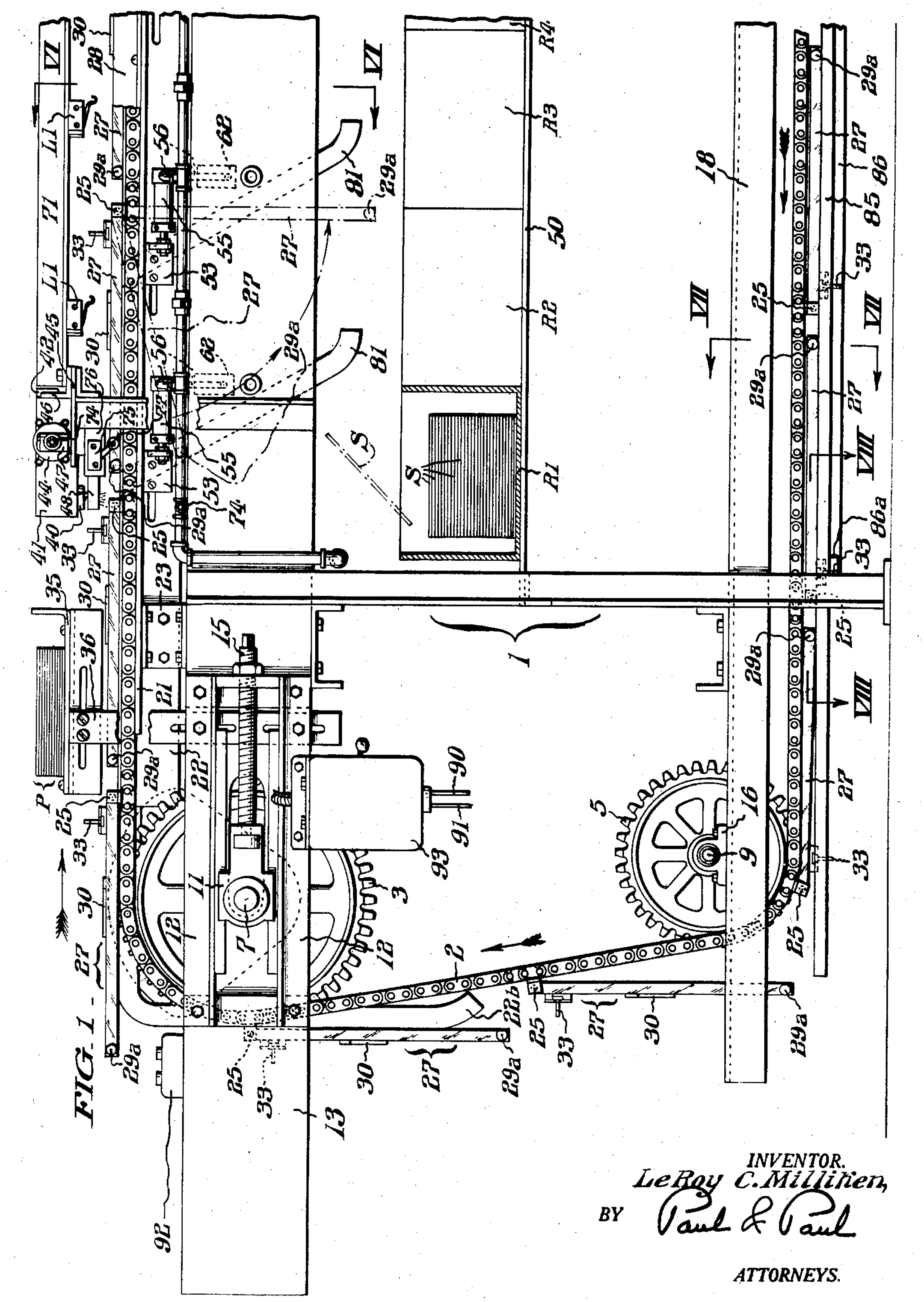
Figure 2:
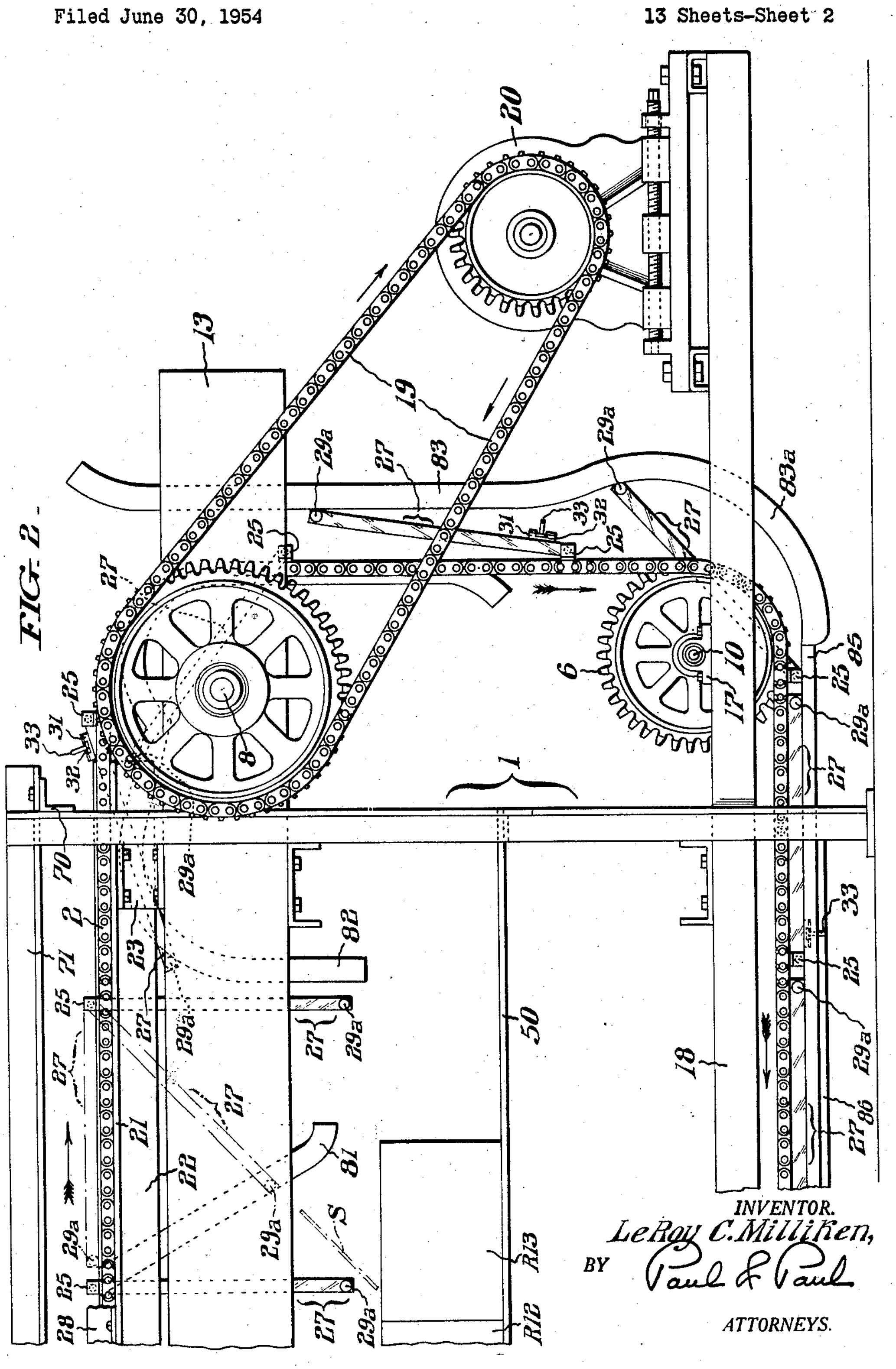

With more specific reference first more particularly to Figs. 1–5, it will be noted that my stocking sorting machine comprises an open foundation frame 1 which may be of structural steel with the component parts thereof rivetted together or otherwise rigidly united at the regions of juncture. Arranged longitudinally within the frame 1 is an endless conveyer whereof the side chains 2 are trained about pairs of upper and lower sprocket wheels 3, 4 and 5, 6 which, respectively, are affixed to transverse shafts 7, 8 and 9, 10 at opposite ends of the machine. The shaft 7 is journalled in bearings 11 which are shiftable along slideways 12 on the upper longitudinals 13 of frame 1 by means of adjusting screws 15, the shaft 8 being rotatively supported in said upper longitudinals, and the shafts 9 and 10 being journalled in fixed bearings 16 and 17 respectively on the lower longitudinals 18 of said frame. As a result of this construction, the chains 2 are constrained to move in substantially rectangular paths in the direction of the arrow shown in Fig. 1, while held taut by proper adjustment of the bearings 11 of shaft 7 by the screws 15. The chains 2 are driven by power transmitted through a speed reducing sprocket chain connection 19 (Fig. 2), to the shaft 8 from an electric motor 20. The upper horizontal runs of the conveyer chains 2 are slidingly sustained from beneath upon tracks 21 and 121 secured to supplemental angle section longitudinals 22 and 122 which are supported by brackets 23 and 123 from the upper main longitudinals 13 and 113 of frame 1 somewhat inward of and above said longitudinals as best shown in Figs. 1, 2, 3, 4 and 6.

Affixed to the chains 2 at uniformly spaced intervals, are lugs 25 with inwardly-extending lateral socket projections **25*a* for reception of pivoting trunnion projections 26*a* of lugs 26 at the frontal corners of flat rectangular trays 27 by which individual stockings to be sorted are temporarily supported in the machine. The trays 27 are struck from sheet material, preferably polished light-reflecting aluminum, stainless steel or other corrosion-resistant metal, and are provided along their end and side edges with downward stiffening flanges. The socket projections 25*a* of the chain lugs 25 ride on the tops of the supplemental longitudinals 22 and 122 during movement of the chains 2 on the track rails 21 and 121, and are gauged by sliding contact of their distal ends with upstanding guard strips 28 and 128 secured to said track rails, see Figs. 3, 4, 6, 10 and 11. At their rear corners, the trays 27 are provided with lugs 29 having short lateral projections 29*a* which, except as later explained, normally ride on the inward horizontal top flanges 22*a* and 122*a* of the supplemental longitudinals 22 and 122 of the frame as best seen in Figs. 3, 4, 5, 6, 10, 11, 12 and 13. Each tray 27 is provided, adjacent one side edge, with a heel stop 30 to facilitate accurate placement of a stocking S thereupon, and along its forward or leading edge adjacent the opposite side edge, with a guideway 31 for a slide 32 having an upstanding stud 33** for a purpose hereinafter described.

The stockings to be sorted are placed in a pile P on a shelf 35 which is bridged over the conveyer at the front or loading end of the machine, and which is suitably supported at its opposite ends from the frame longitudinals by brackets 36 and 136. As the trays 27 successively assume a horizontal position immediately after rounding the sprockets 3 at the loading end of the machine, individual stockings S are taken from the pile P by hand and positioned on said trays in the manner previously pointed out with their heels lodged in the stops 30, for advancement of the stockings rightward in Figs. 1 and 3 beneath the shelf 35.

The means provided for successively sensing the stockings for length includes a photo electric eye 40 within a housing 41. As shown, this housing 41 is mounted on a slide carriage 42 attached to the outer end of the piston 43 of a double acting air cylinder 44 supported at one side of the machine by a fixed bracket 45, said carriage being shiftable in and out to a limited extent transversely of the machine on a fixed cross member 46. Compressed air is admitted to and exhausted from cylinder 44 under the control of a magnetically-actuated slide valve 47 which will be referred to again presently. Also secured to the piston 43 of cylinder 44 is a pusher projection 48 for engaging the upstanding studs 33 of the slides 32 as the trays 27 successively pass beneath the sensing eye 40.

For the purpose of sensing the height of the high heel reinforcements H of the stockings, I have shown a second photo electric scanning eye 140 which is like the one previously described. The eye 140 is similarly disposed within a housing 141 mounted on a separate slide carriage 142 which is secured to the outer end of the piston 143 of another fixedly supported double-acting air cylinder 144, said housing being shiftable back and forth transversely of the apparatus on the cross member 46 previously referred to, and compressed air being admitted and exhausted from said cylinder under control of a magnetically-actuated valve 147. Engaged in separate guideways 131 on the trays 27 are slides 132 with upstanding pins 133 which are adapted to be engaged by a pusher projection 148 also affixed to the piston rod of the cylinder 144.

Figure 3:
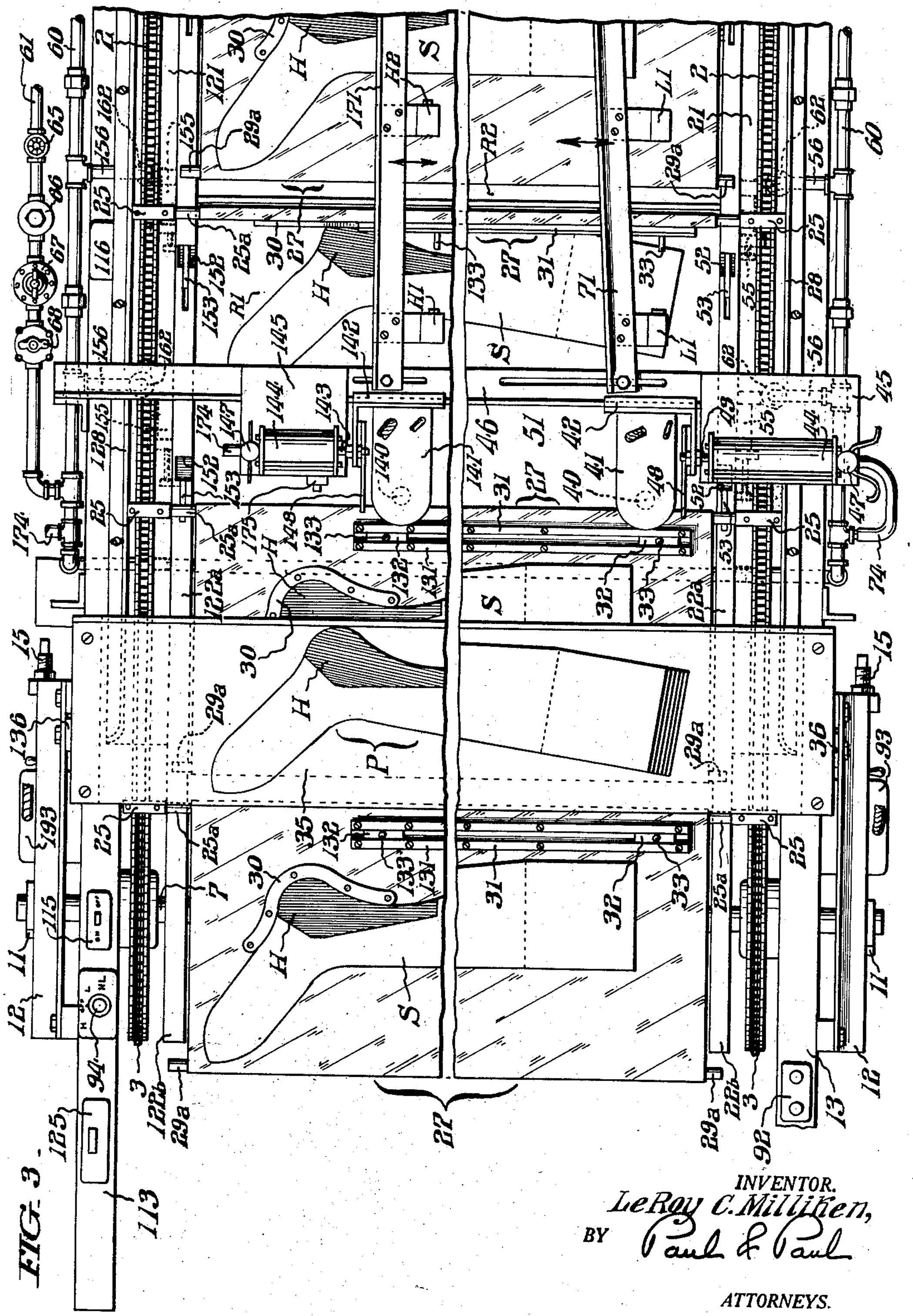

Placed upon a shelf 50 below the upper run of the conveyer is a longitudinally-arranged series of bins or receptacles R1–R13 respectively receiving differently proportioned stockings. Above the locations of the bins R1–R13, the horizontal flanges **22*a* and 122*a* of the supplemental longitudinals 22 and 122 have cut-outs or voids 52 and 152 which are uniformly spaced to correspond with the spacing of said bins. These cut-outs or voids 52 and 152 are normally closed by withdrawable slides 53 and 153 which are operatively connected individually to the spring retracted piston rods of actuating air cylinders 55 and 155 respectively. Extending to the cylinders 55 and 155 are branches 56 and 156 of a piping system 60 which is in communication, through a main 61 (see Figs. 3 and 4), with a suitable supply source (not shown) of compressed air. Interposed in each of the pipe branches 56 and 156 are magnetically-actuated control valves 62 and 162; and interposed in the main 61, see Fig. 3, is a manual shut-off valve 65, a strainer 66, a pressure regulator 67 and a lubricator 68. As shown in Fig. 3, the magnetically-actuated control valves 47 and 147 for the cylinders 44 and 144 are connected to the piping 60 by tubes 74 and 174. Inward movement of the sensing eye 40 is initiated through actuation of a switch 75 which is secured to a pendent projection 76 of bracket 45 (see Figs. 12, 13), the operating arm 77 of said switch extending into the path of the pivot lugs 25 of the trays 27 at one side of the machine. Similarly, the inward movement of the sensing eye 140 is initiated through actuation of a switch 175 which is secured to a pendent projection 176 of the bracket 145 (see Figs. 14 and 15) the operating arm 177 of said switch extending into the path of the heel stops 30 of the trays 27** at the other side of the machine.

Diagonally arranged above the conveyer, with one end thereof supported by the cross member 46 and the other end thereof supported by a cross member 70 further along in the machine, is a bar 71 whereto is secured at the bottom at intervals corresponding to the spacing of the voids 52 in the longitudinals 22 and 122, a series of electric switches L1, L2, L3 and L4, which are adapted to be closed individually by the studs 33 differently positioned on said trays by the action of the pusher projection 48 associated with the carriage of the sensing eye 40. Affixed to another bar 171 supported like the bar 71 by the cross members 46 and 70 is a series of micro switches H1, H2 and H3 which are adapted to be closed individually by the studs 133 differently positioned on the trays by the action of the pusher projection 148 associated with the carriage of the sensing eye 140, and thereby complete electrical circuits for the actuation of the magnetic valves 62 and 162 that control the operation of the slide withdrawing cylinders 55 and 155.

Figure 7:
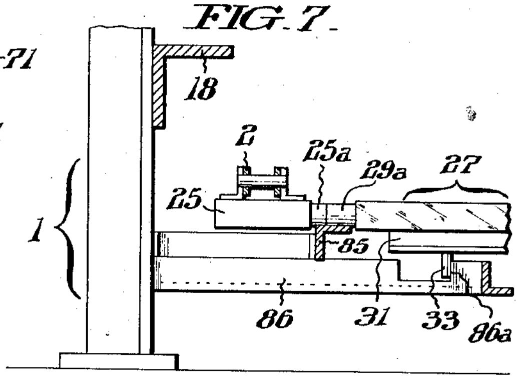
Figure 8:
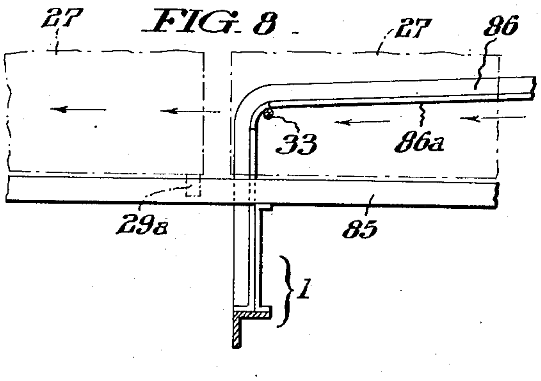
Fig. 8 is a fragmentary detail view in horizontal section taken as indicated by the angled arrows VIII—VIII in Fig. 1.
Figure 9:
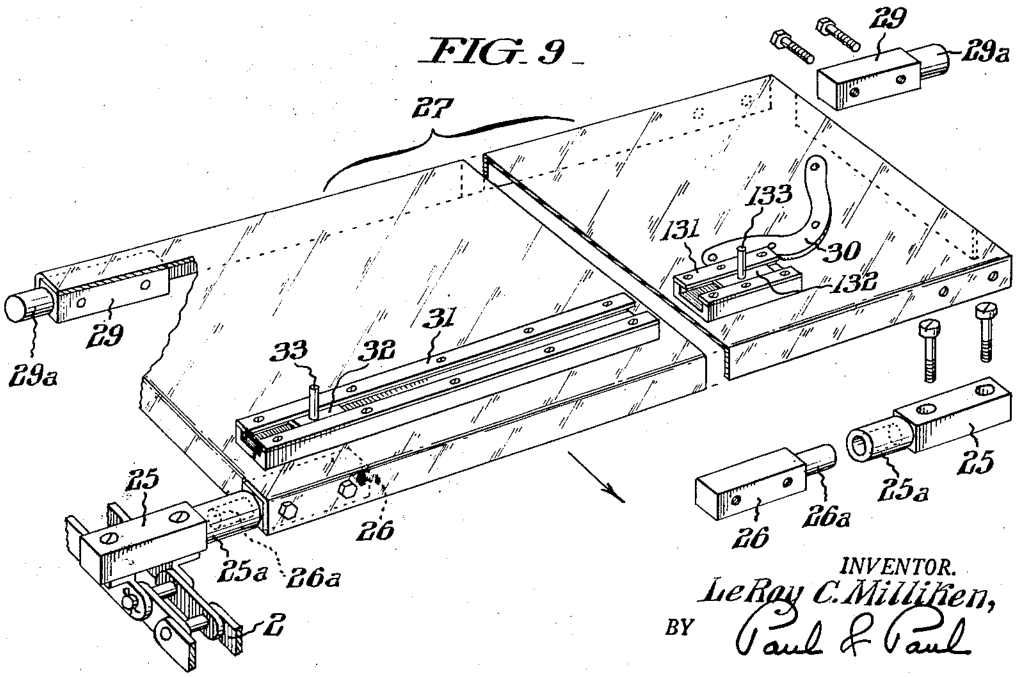
Figs. 9, 10, 11, 12, 13, 14 and 15 are fragmentary detail perspective views of various portions of the machine.
Figures 10, 11:
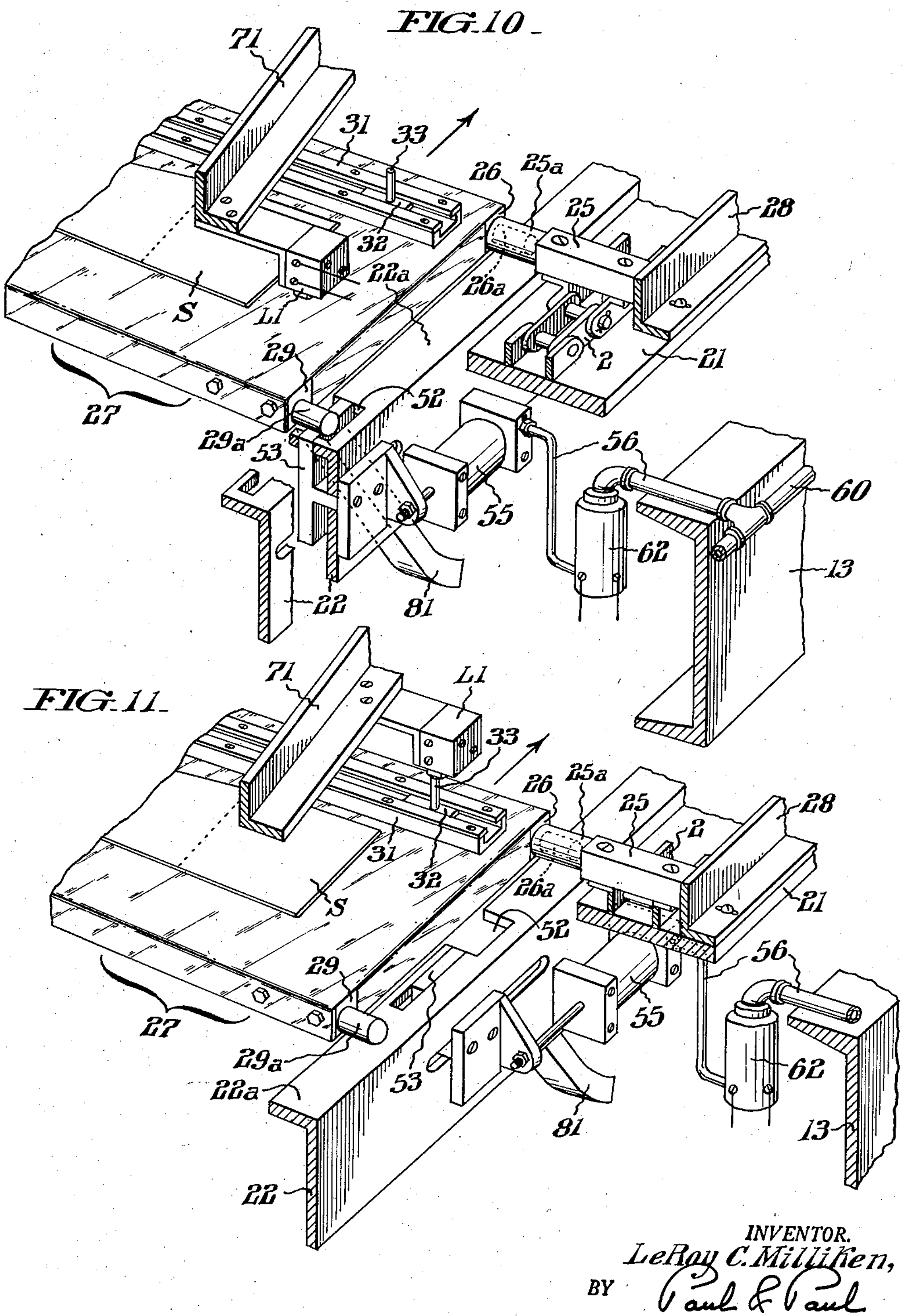

Upon being successively released to swing downward about the lugs 25 on the chains 2, the trays drop the stockings of different lengths and high heel proportions into the proper receivers as also later on explained, their fall being controlled by cooperation of their rear lug projections **29*a* with fixed inclined angle section guides 81 (Figs. 1 and 2) which extend downwardly and rearwardly from longitudinals 22 and 122 and of which the bottom ends are rearwardly curved on a relatively short radius. Before rounding the sprockets 4, the trays 27 are once again leveled by cooperation of the rear lugs 29*a* with other fixed guides 82 and, as the chains 2 pass down from the sprockets 4 to the sprockets 6, said trays are controlled by engagement of their said rear lugs 29*a* with fixed vertical guides 83 whereof the lower portions are rounded as at 83*a* toward the last mentioned sprockets to merge with horizontal guide rails 85 secured to the frame 1 below the bottom longitudinals 18. As the lower runs of the chains 2 move horizontally toward the front or feeding end of the machine, the trays 27 are kept level as their rear lugs 29*a* ride the rails 85. From Fig. 1, it will be noted that the rails 85 terminate somewhat forward of the sprockets 5 to keep control of the trays until they assume a vertical position in suspension. During horizontal travel of the trays 27 in the lower part of the machine, the slides 32 and 132 on them are restored to their original positions by engagement of the studs 33 and 133 with the inclined edges 86*a* and 186*a* of cam bars 86 and 186 affixed to frame 1, see Figs. 5, 7 and 8. As the trays move upward and round the sprockets 3 they are prevented from swinging by engagement of their tail lugs 29*a* with the pendent frontal end portions 22*b* and 122*b* of the rails 22 and 122**.

Figure 5:
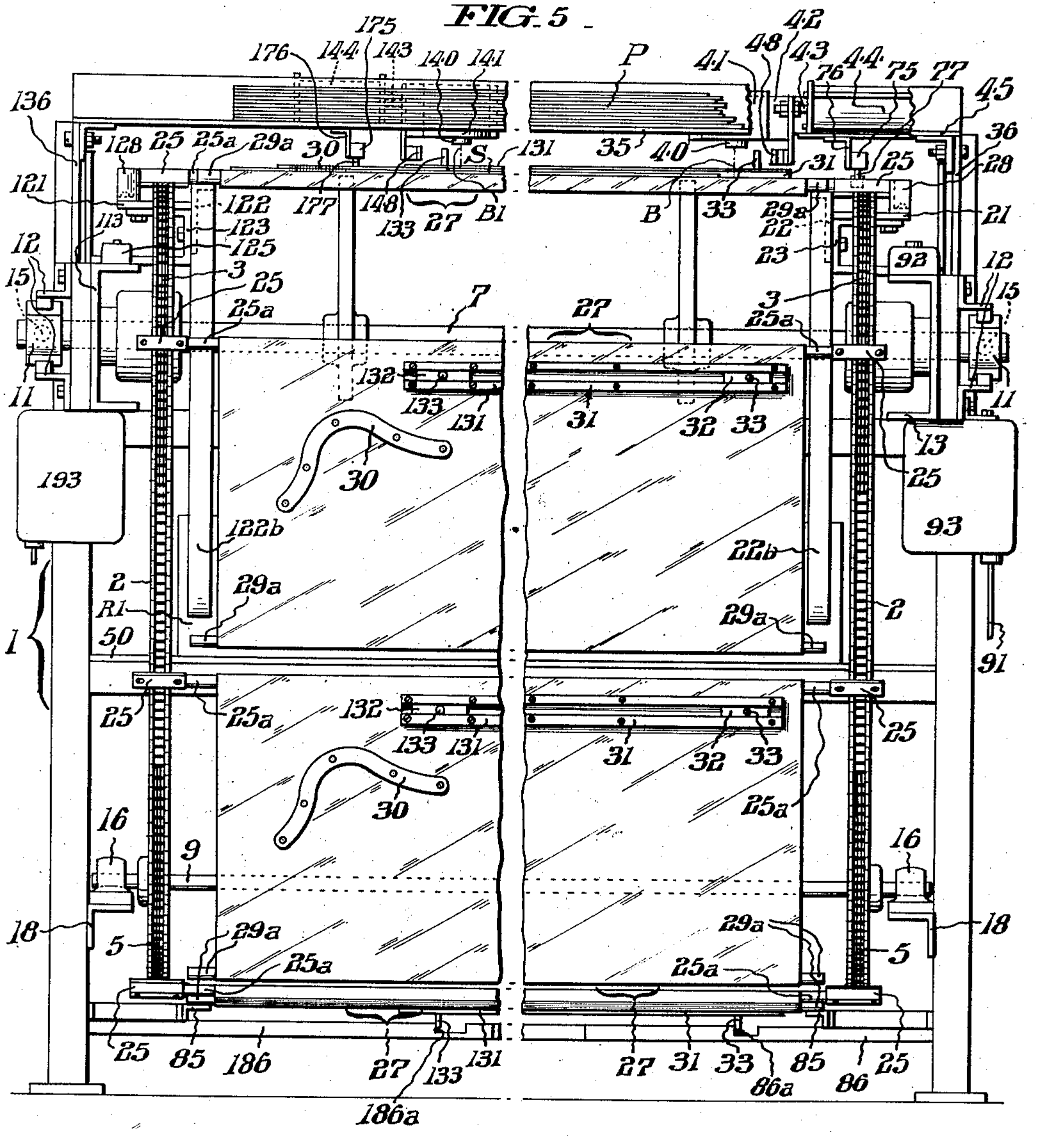
Fig. 5 shows, in elevation, the front or loading end of the machine as seen from the left of Figs. 1 and 3, with the mid portion broken out.
Figure 6:
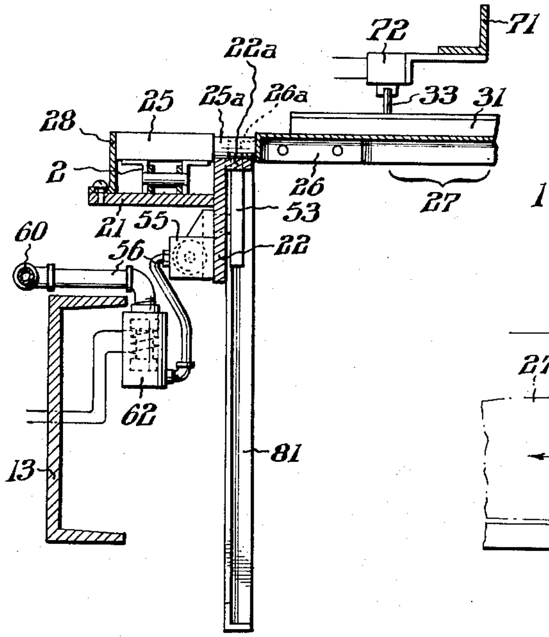
Figs. 6 and 7 are fragmentary detail views in transverse section taken as indicated respectively by the angled arrows VI—VI and VII—VII in Fig. 1.
Figure 16:
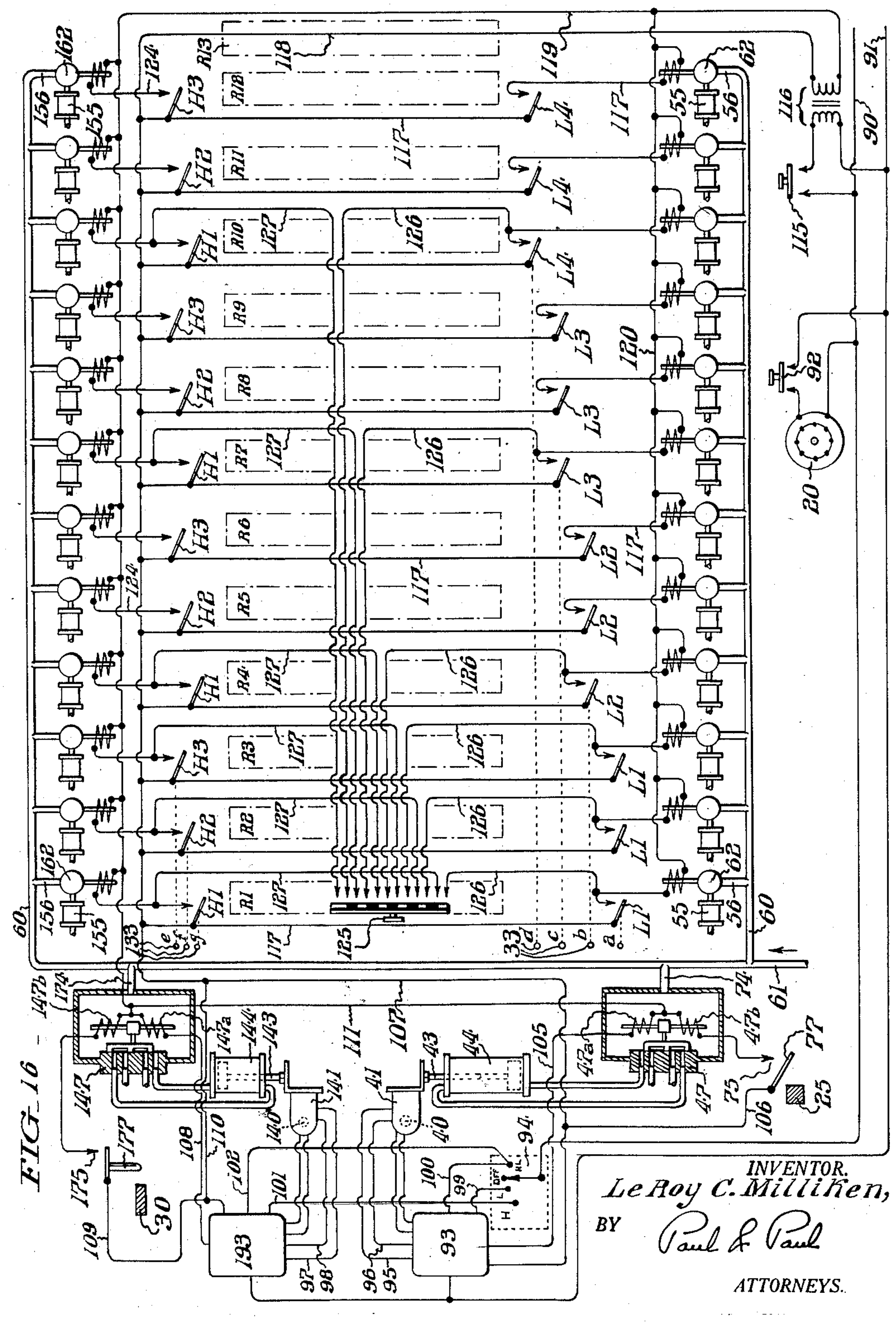
Fig. 16 is a diagrammatic view showing the connections between various pneumatic and electrical devices embodied in the machine.

Referring now to the diagram of Fig. 16, the current for the energization of the various electrical instrumentalities hereinbefore described is supplied from the mains 90, 91, say of a 220 volt A. C. power line across which the motor 20 is directly connected with interposition of a push button switch 92 located, as shown in Figs. 1, 3 and 5, on the frame 1 in convenient reach of an attendant stationed at the loading end of the machine.

As shown in Fig. 16, the power main 90 extends to the setting arm of a selector switch 94 having the contacts H, L and HL, and the conductor 91 extends to relays 93 and 193 which, respectively, are controlled by impulses from photo electric eyes 40 and 140 transmitted through connecting conductors 95, 96 and 97, 98 respectively. The power leads 99 and 100 for the relay 93 are connected respectively to the contacts L and HL of the selector switch 94, and the power leads 101 and 102 for the relay 193 are connected to the contacts H and HL of the selector switch 94. Leads 105 and 106 from the relay 93 are connected to the remote ends of the axially aligned coils **47*a* and 47*b* of the magnetically-actuated valve 47 for the cylinder 44, the switch 75 being interposed in the conductor 106. Leads 108 and 109 from the relay 193 are similarly connected to the remote ends of the coils 147*a* and 147*b* of the magnetically actuated valve 147 for the cylinder 144, the opposite or contiguous ends of said coils being connected by a conductor 111 to the contiguous ends of the coils 47*a* and 47*b* of the valve 47, and the switch 175 being interposed in the conductor 109**.

Connected across the mains 90 and 91, with interposition of a manually operable switch 115, is the primary of a transformer 116 by which the E. M. F. is reduced, say to eight volts for use in actuating the magnetic valves 47 and 147 which control the photo electric eye shifting cylinders 44 and 144, and the magnetic valves 62 and 162 which control the slide retracting cylinders 55 and 155, said switch 115 being located adjacent the switch 94 at the loading end of the machine as shown in Fig. 3. Through conductors 107 and 110, the leads 106 and 108 are connected to the conductor 118, while a conductor 111 in continuation of the conductor 119 extends to the common terminals of the coils *47a, 47b* and 147*a*, 147*b* of the valves 47 and 147 respectively. The coils of the magnetic valves 62 are in series with the respectively corresponding switches L1–L4 through conductors 117 and connected by a branch 120 of conductor 119 in parallel across the conductors 118 and 119 leading from the secondary of the transformer 116. The coils of the magnetic valves 162 for the cylinders 155 are likewise in series with the respectively corresponding switches H1–H3 through conductors 124 and connected in parallel between conductors 118 and 119. A manually-operable gang switch conventionally indicated at 125 is provided with metallic segments which, under certain conditions later on described, are adapted to bridge the terminal contacts of pairs of conductors 126 and 127 which extend from the fixed terminals of corresponding pairs of switches of the groups L and H.

*Operation*

Figure 4:
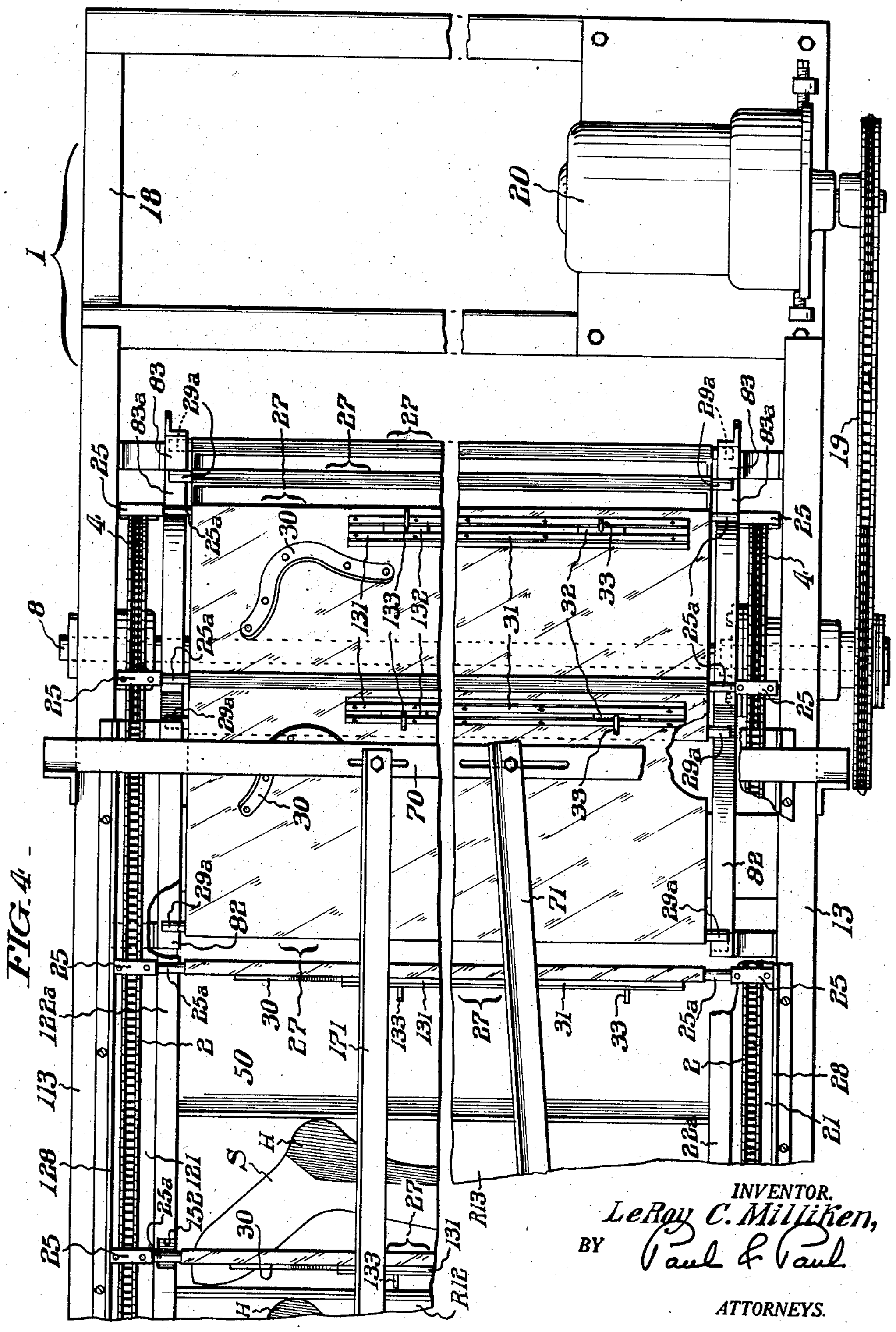
Figure 12:
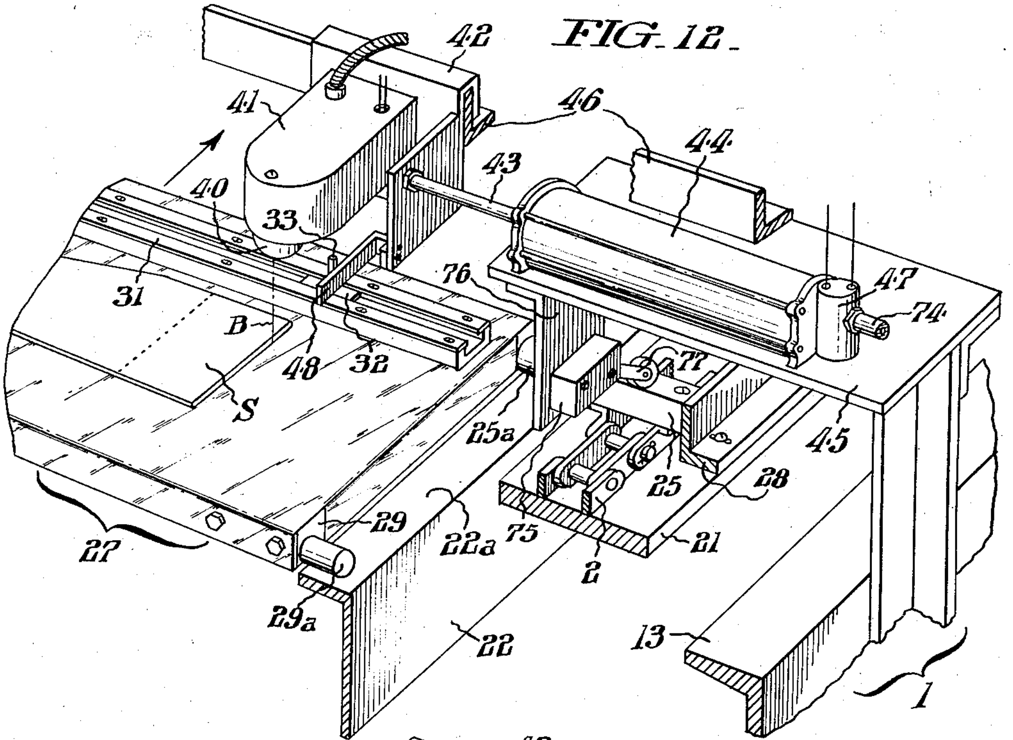
Figure 13:
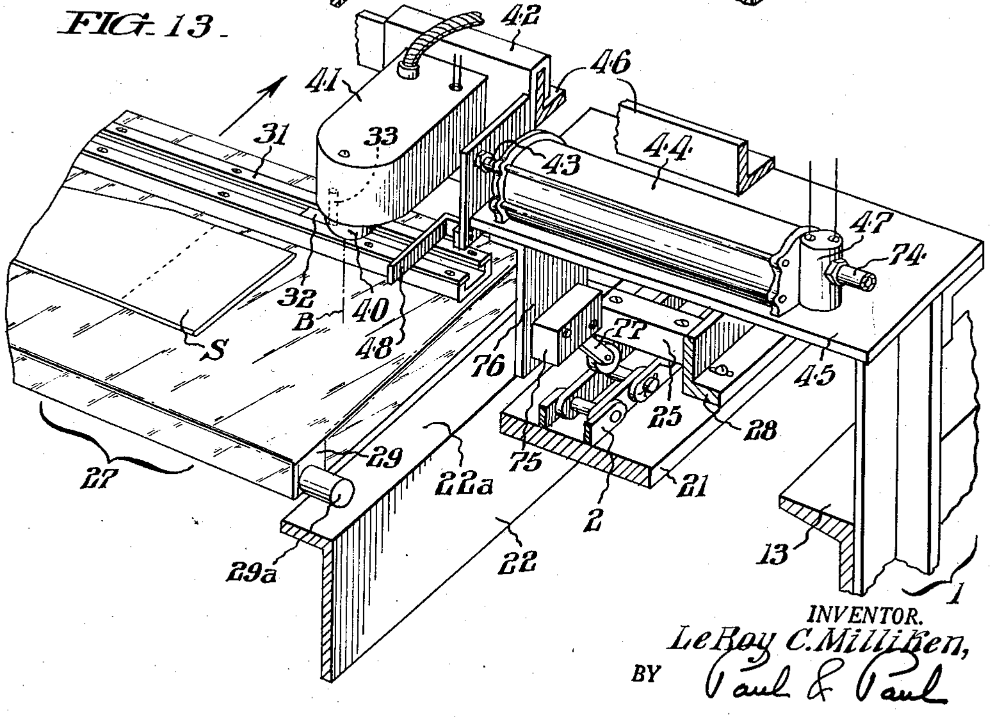
Figures 14, 15:
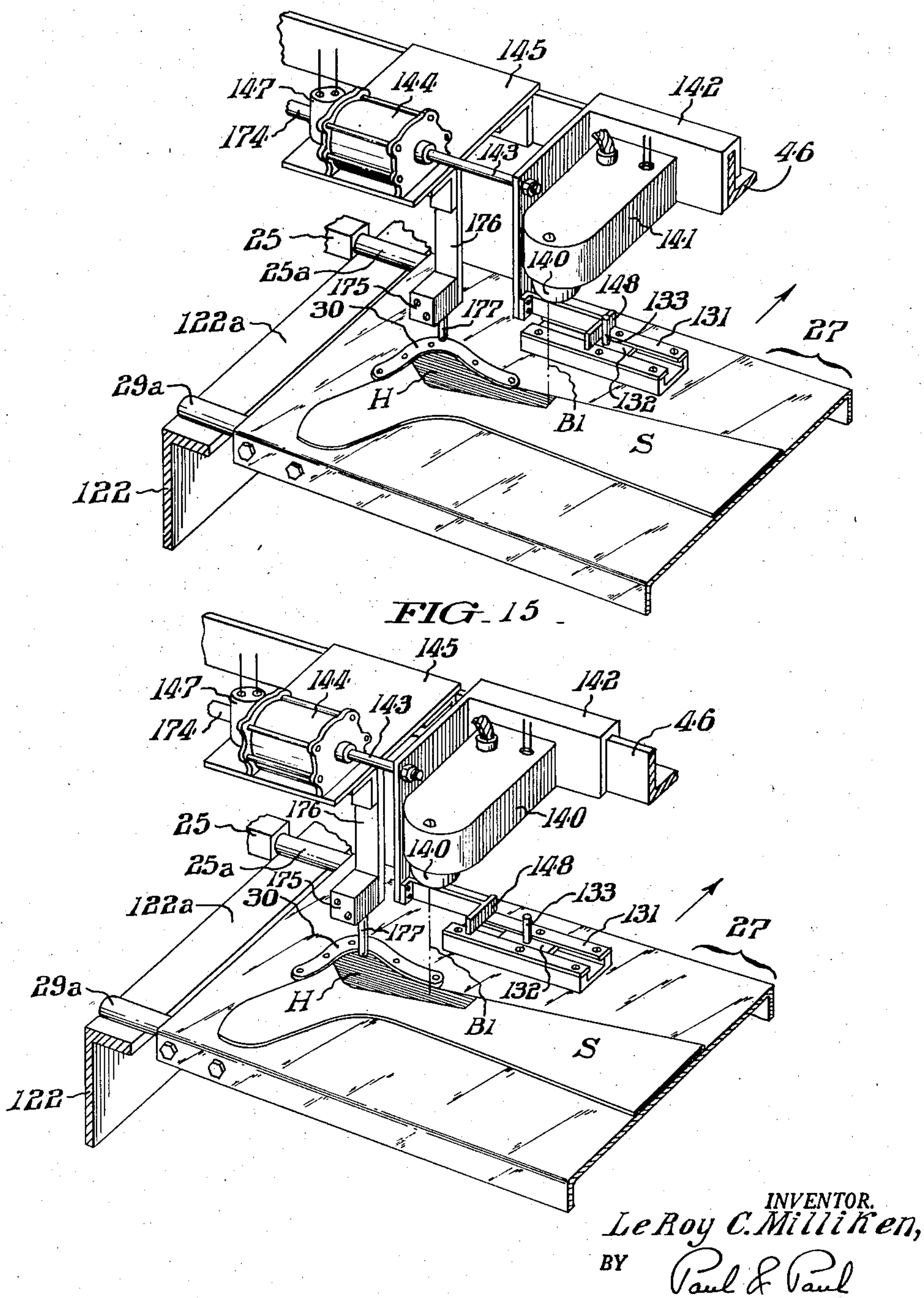
Figure 17:
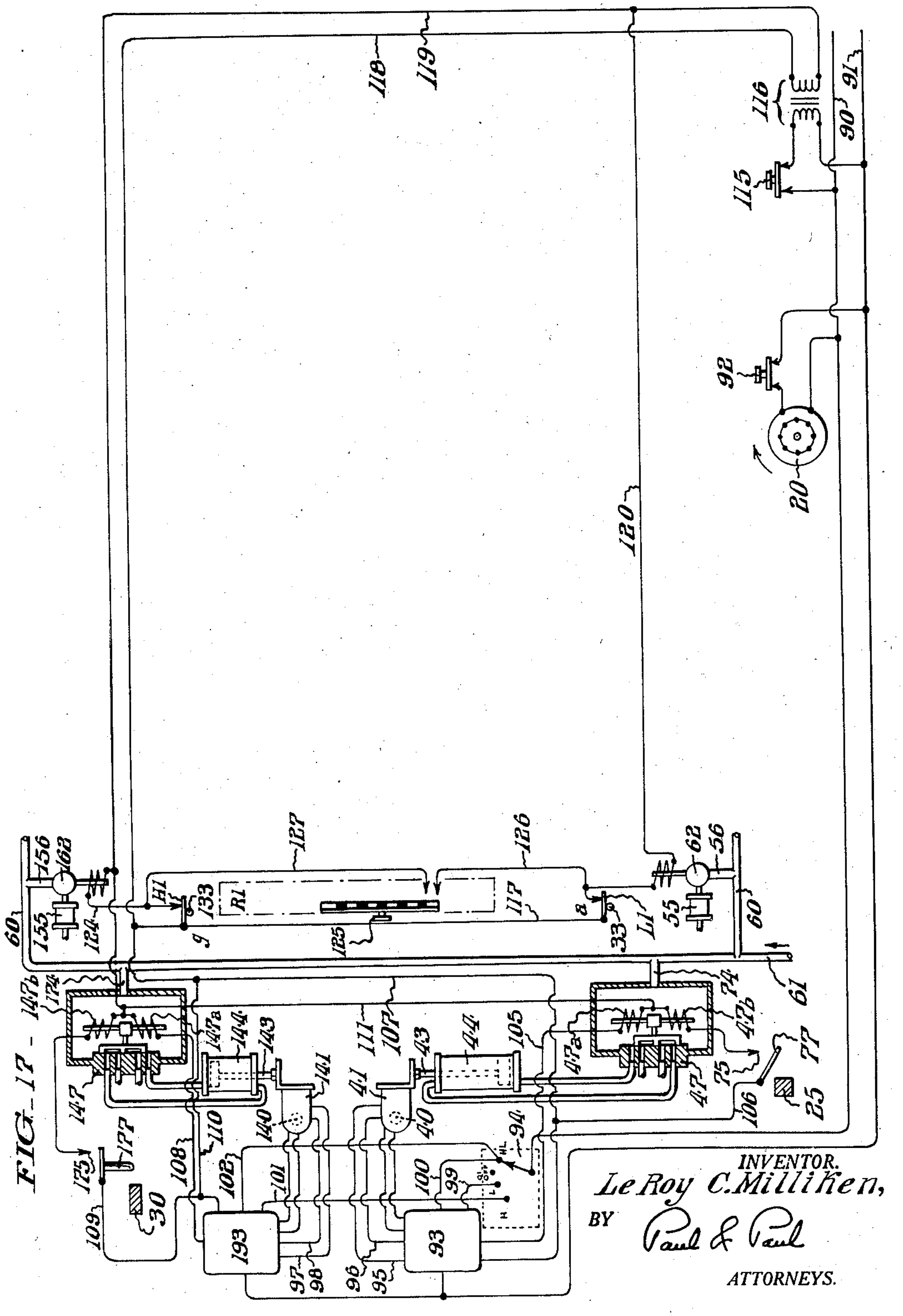
Fig. 17 is a view similar to Fig. 16 with the control switches for the electrical devices set for automatic sorting by the machine of stockings of varying lengths and heel heights.

To prepare the machine for the sorting of stockings in accordance with both differences in length and with differences in reinforced heel height, the selector switch 94 is shifted to the HL position, the gang switch 125 is set in open position, and the switches 92 and 115 are closed—all as shown in Fig. 17. With the motor 20 now running, the conveyer is moved at a moderate linear speed, and, as each tray assumes a horizontal position after rounding the sprockets 3, a stocking is taken from the pile P and laid flat upon the tray transversely of the machine in a definite position determined by lodgment of its heel in the stop 30 of the tray as previously explained. As the tray passes beneath the sensing eyes 40 and 140, the pivot lug 25 at one side of the tray encounters the arm 77 of the switch 75 and closes the latter, and the heel stop 30 on the tray encounters the arm 177 of the switch 175 to close the latter. As a consequence, the coils 47*a* and 147*a* of the magnetic valves 47 and 147 are energized for admission of compressed air into the cylinders 44 and 144, whereby the photo electric eyes 40 and 41 are moved inward of the machine from the normal retracted positions in which they are shown in Figs. 13 and 15. By affectation of the beams B and B1 from the eyes 40 and 140 respectively in encountering the top edge of the stocking S and the top edge of its heel reinforcement H, current is supplied to the coils *47b* and 147*b* of the valves 47 and 147 which latter are thereby actuated for admission of air into the opposite ends of the cylinders 44 and 144 for return of the eyes to their normal retracted positions. During the inward movements of the eyes 40 and 140 as just explained, the upstanding stud 33 of the slide 32 on the tray is shifted along its guideway by the projection 48 on the carriage 42 to a position in line with the top edge of the stocking as shown in Fig. 12, and the upstanding stud 133 of the slide 132 is shifted along its guideway by the projection 148 on the carriage 142 to a position in line with the top of the heel reinforcement as shown in Fig. 14. Assume that, by the particular stocking referred to, the studs 33 and 133 on the supporting tray were positioned to actuate the first pair of switches L1 and H1 in the direction of conveyer travel as in Fig. 17 and that the coils of the valves 62 and 162 are thereby energized to open said valves for actuation of the corresponding cylinders 55 and 155 and withdrawal of the corresponding slides 53 and 153 from the corresponding voids 52 and 152 in the rails 22 and 122. Thus, as the tray continues in its advance, it is released to swing downward about the pivots 26*a* at its front edge upon arrival of the lugs 29*a* at its rear edge at said voids and to drop the stocking into the first receptacle R1. In this connection it is to be noted that in Fig. 16, the switches L1–L4 and the switches H1–H3 are arranged for the sorting of stockings of four different lengths and three different heel heights. Thus in Fig. 16, the switches L1–L4 will be actuated by the studs 33 when the latter are shifted to the positions *a–d* respectively, while the switches H1–H3 will be actuated by the studs 133 when the latter are shifted to the positions 3–*g* respectively. Accordingly, stockings of one nominal length (which may vary to the extent of ¼ inch) but having different heel heights will be sorted and discharged respectively into the receptacles R1, R2 and R3. Slightly shorter stockings alike as to length but having heels of different heights will be discharged respectively into the next three receptacles R4, R5 and R6 and so on, the shortest ones being discharged into the receptacles R10, R11 and R12. Real short stockings beyond the reach of movement of the sensing eye 40 will be discharged into the last receptacle R13 when the rear lugs 29*a* of the trays supporting such stocking reach the last of the notches 52 and 152 in the rails 22 and 122 which notches, it will be noted from Fig. 4 are without slides. As the trays move forward along the bottom of the machine toward the feeding end of the latter, the studs 33 and 133 on them are gradually restored to their normally-retracted positions by engagement with the inclined edges of the cam rails 86 and 186 after the manner shown of one of the studs 33 in Fig. 8.

Figure 18:
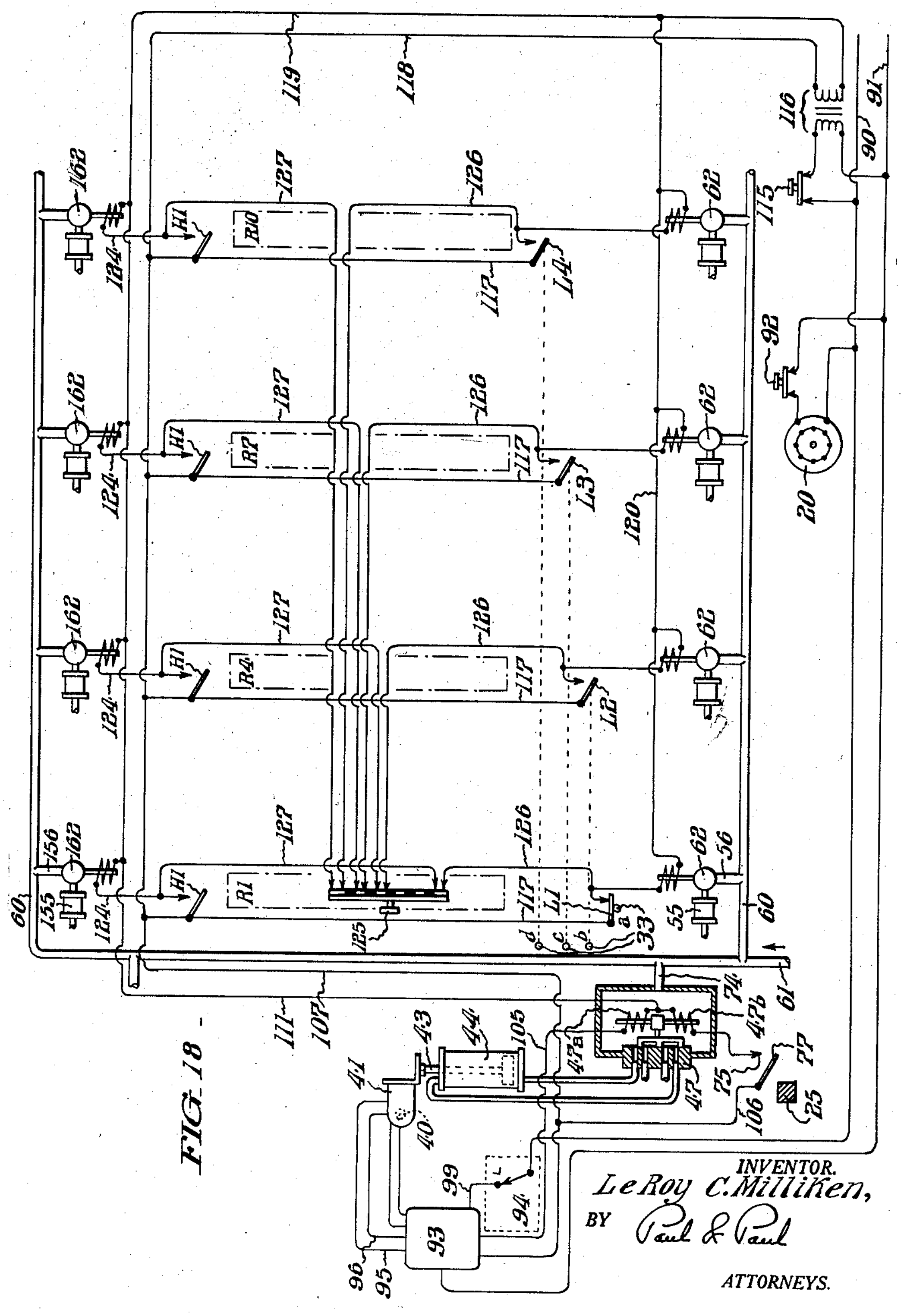
Figs. 18 and 19 are views which, in turn, are similar to Fig. 16 but with the control switches set respectively for automatic sorting of stockings of different lengths only, and for automatically sorting stockings in accordance with variations in heel height only.

To prepare the machine for sorting stockings according to length only, the selector switch 94 is set to the position L, and the gang switch 125 is clsoed as shown in Fig. 18. By thus setting the switch 94, the circuit containing the heel scanning eye 140, the coils of the magnetic valve 147 and the relay 193 is opened to prevent said eye from functioning. (For the sake of simplicity of illustration, the eye 140 and associated parts have been omitted from Fig. 18.) Under the conditions just explained, the studs 133 on the trays will remain idle in their normal retracted positions. However, the other studs 33 on the various trays will be shifted under control of the length scanning eye 40 to the positions *a, b, c* or *d* for the ultimate action of the first switches of the groups L1, L2, L3 and L4 depending upon the lengths of the stockings which will be dropped into the receptacles R1, R4, R7 and R10, the valves 162 corresponding to the magnetic valves 62 actuated through closing of said first switches of the respective groups L1–L4 being concurrently actuated due to the bridging of the conductors 126, 127 by the gang switch 125, the corresponding slides 52 and 152 being thereby withdrawn from the voids 53 and 153 in the rails 22 and 122 at opposite sides of the machine for release of the trays in a manner already understood.

Figure 19:
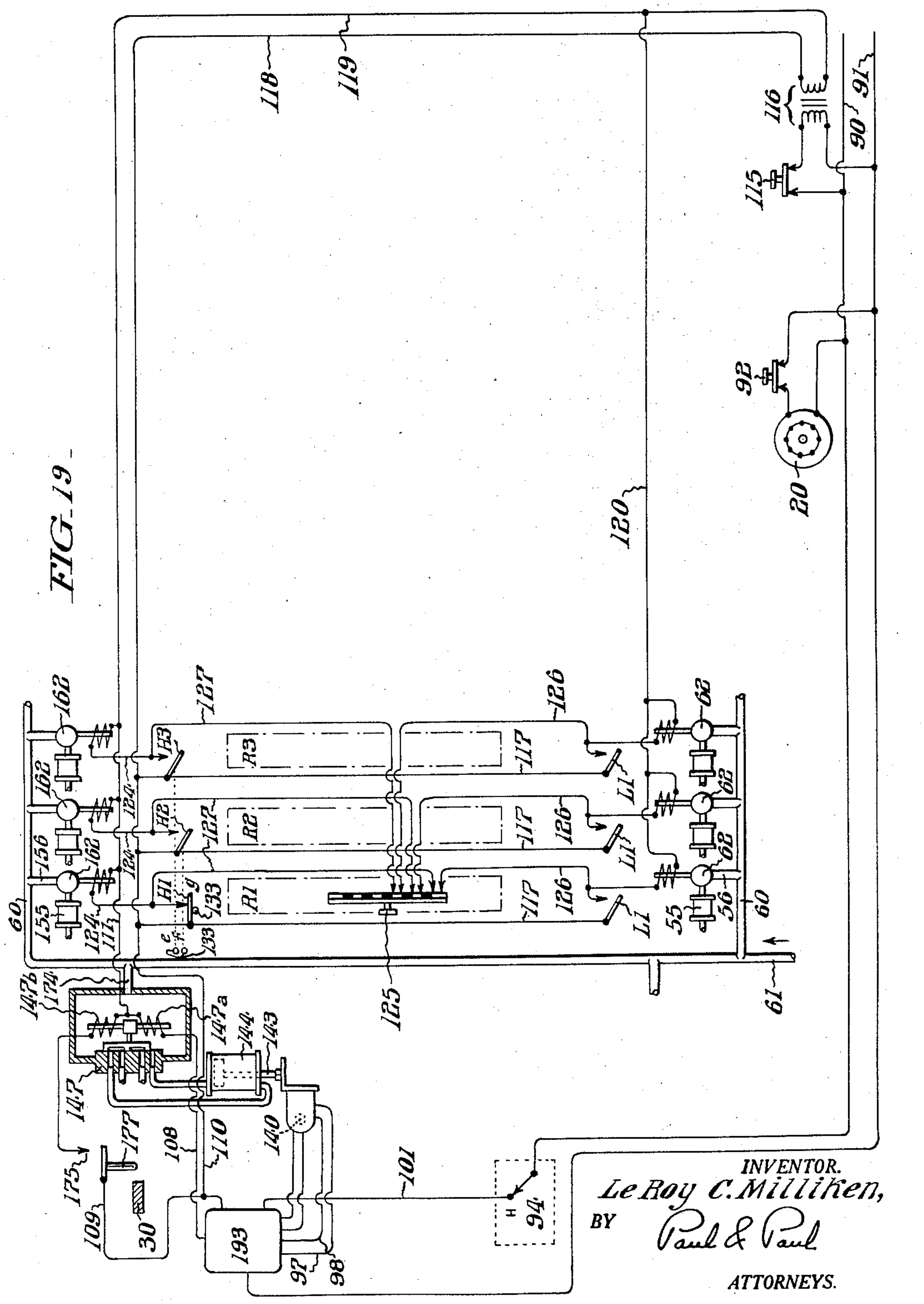

To prepare the machine for sorting stockings according to heel height only, the gang switch 125 is closed and the selector switch 94 is set to H position as in Fig. 19 as a result of which the scanning eye 40 is rendered inoperative together with the parts controlled thereby, the showing of the latter elements having therefore been omitted from Fig. 19. Under these circumstances the studs 33 on the trays will be unaffected and remain idle in their normal retracted positions. The studs 133 on the successive trays will however be shifted to the positions *e, f* or *g* for the ultimate actuation of the switches of the first group H1, H2 and H3 depending on the heel heights of the stockings which will be dropped into either the first, second or third receptacles R1, R2 and R3, the magnetic valves 62 corresponding to the magnetic valves 162 actuated through closing of the switches H1, H2 and H3 being concurrently actuated due to the bridging of the conductors 126, 127 by the gang switch 125, the corresponding slides 52 and 152 being thereby withdrawn from the voids 53 and 153 in the rails 22 and 122 at opposite sides of the machine for release of the trays, here likewise in a manner already understood.

The photo electric eyes, the various electrically-actuated valves, and the various pneumatic devices conventionally represented in the drawings may be of any approved commercially-available types capable of functioning as hereinbefore described for the purposes of my invention.

It is to be understood that I do not consider myself limited to the precise details of construction and arrangement herein shown by way of example, since various modifications can be readily made within the scope of the appended claims as will be readily apparent to those skilled in the mechanical and electrical arts.

Having thus described my invention, I claim:

1. In a machine for sorting stockings differing in length and in the height of their reinforced heel areas, a driven conveyer upon which the stockings are transversely placed in succession and in spaced relation with their heels all aligned longitudinally of the conveyer, at a feeding station; a series of receivers arranged along the conveyer for reception respectively of differently proportioned stockings; means adjacent the feeding station respectively for sensing the length of each passing stocking and for sensing the height of the reinforced heel area of such stocking; devices at the regions of placement of each stocking on the conveyer moved into definite positions on the conveyer by the respective sensing means; and means at the locations of the respective receivers actuated by the devices differently positioned on the conveyer by the respective sensing means to effect transfer of different stockings of like lengths and heel heights to the particular receivers provided for their collection.

2. A sorting machine characterized as in claim 1, further including means whereby the machine can be set for sorting stockings according to length alone, or according to the height of their heel reinforcements alone.

3. In a machine for sorting stockings differing in length and in the height of their reinforced heel areas, a driven conveyer comprising a pair of horizontally-arranged laterally-spaced endless chains trained about end sprocket wheels on transverse shafts; trays for supporting individual stockings, each pivotally connected at its front end to the chains and each having lateral projections at its rear corners; a series of receptacles disposed longitudinally beneath the upper run of the conveyer for collection of the differently proportioned stockings; tracks along the upper run of the conveyer overtravelled by the projections at the rear corners of the trays for temporary support of the trays in horizontal position, each track having voids at the locations of the respective receptacles; two normally-retracted studs separately shiftable on each tray in the direction of the stocking placed thereon at a loading station at one end of the machine; separate automatic means respectively for sensing the length and the heel height of each passing stocking and for shifting the respective studs on each tray in accordance with the length and with the heel height of the stocking; retractable filler elements normally occupying the voids in the tracks; and individually associated means adapted to be actuated by the studs differently positioned on the trays to withdraw the filler elements for release of the trays to swing downwardly about their hinge connections with the chains and thereby discharge the different stockings into the respective receptacles provided for their collection.

4. A stocking sorting machine, according to claim 3, further including guide means for controlling the downward swing of the individual trays upon being released.

5. A stocking sorting machine, acocrding to claim 3, further including means for restoring the studs on the trays to their normal retracted positons before the trays are again presented at the loading station.

6. A stocking sorting machine, according to claim 3, further including a stationary cam positioned along the lower return run of the conveyer for engaging the studs on the trays to restore the studs to their normal retracted positions before the trays are again presented at the loading station.

7. A stocking sorting machine, according to claim 3, wherein the withdrawing means for the filler elements include pressure fluid actuated cylinders with individually associated electrically-operable control valves; and switches differently positioned along the machine and respectively in circuit with the electrically-operable control valves, adapted to be closed by the differently positioned studs on the passing trays.

8. In a machine for sorting stockings differing in length and in the height of their reinforced heel areas, a driven conveyor comprising a pair of laterally-spaced horizontally-arranged endless chains; end wheels about which the chains are trained; a series of trays pivotally connected at their front edges to the chains and having lugs extending laterally from their rear corners; horizontal supporting tracks for the upper runs of the chains upon which the respective rear corner lugs on the trays normally travel for maintenance of the trays normally in horizontal position, said tracks having, at intervals corresponding substantially to the spacing of the trays, voids in transverse alignment; a horizontally-arranged series of receptacles, respectively for reception of the different stockings, disposed longitudinally beneath the upper run of the conveyer in correspondence with the transversely-aligned voids in the tracks; individually withdrawable slides normally closing the voids in the respective tracks; an electrically-controlled actuating means for each slide; heel stops on the trays for definite placement of individual stockings upon the trays transversely of the machine as the trays arrive successively at a feeding station at one end of the machine; photo electric sensing eyes on normally retracted carriages movable back and forth over the conveyer from opposite sides of the machine on a transverse guideway adjacent the loading station; means for so moving the carriages as each tray arrives beneath them; normally retracted studs on each tray shiftable in the direction of the length of the supported stocking respectively adjacent the heel and the top end thereof; means controlled by the eyes as their beams respectively encounter the top edge of the reinforced area and the top edge of each stocking to stop the respective carriages; means on the respective carriages for shifting the studs to definite positions on each presented tray in accordance with the heel height and the length of the supported stocking; and two series of differently positioned switches arranged along the machine and respectively connected in separate circuits with the electrically controlled actuating devices for the respective groups of slides, and adapted to be closed by the differently positioned pairs of studs on the different trays to effect withdrawal of the corresponding pairs of slides as the lugs at the rear corners of the trays reach the voids in the tracks, whereby the trays are released to swing downward about their pivotal connections with the conveyer chains for discharge of the different stockings into the receivers respectively provided for their collection.

9. A sorting machine characterized as in claim 8, further including selective switch means whereby the circuits can be arranged for operation of electrical actuating means for the two groups of slides under control of either photo electric eye, so that the machine can be utilized for sorting stockings of different lengths alone, or for sorting stockings according to the height of their heel reinforcements alone.

10. In a machine for sorting stockings according to length, a driven conveyer upon which the stockings are transversely placed in succession and in spaced relation with their heels all aligned longitudinally of the conveyer, at a feeding station at one end of the machine; a series of receivers arranged along the conveyer for reception respectively of stockings of different lengths; means adjacent the feeding station for sensing the length of each passing stocking on the conveyer; a device at the region of placement of each stocking on the conveyer moved into a definite position, in accordance with the length of such stocking, by the sensing means; and means at the locations of the respective receivers actuated by the devices differently positioned on the conveyer by the sensing means to effect transfer of the stockings of corresponding lengths to the particular receivers provided for their collection.

11. In a machine for sorting stockings according to length, a driven conveyer comprising a pair of horizontally-arranged laterally-spaced chains trained about end sprocket wheels on transverse shafts; trays for supporting individual stockings, each pivotally connected at its front end to the chains and each having a lateral projection at one of its rear corners; a series of receptacles disposed longitudinally beneath the upper run of the conveyer for collection respectively of the stockings of different lengths; a track along the upper run of the conveyer over-travelled by the projections at the rear corners of the trays for temporary support of the trays in horizontal position, said track having voids at the locations of the respective receptacles; a normally-retracted stud shiftable on each tray in the direction of the length of the stocking placed thereon at a loading station at one end of the machine; automatic means for sensing the length of each passing stocking and for shifting the stud on the corresponding tray to a definite position on such tray according to the length of the stocking; retractable filler elements normally occupying the voids in the track; and individually-associated means adapted to be actuated by the differently positioned studs on the trays to withdraw the filler elements for release of the trays to swing downwardly about their hinge connections with the chains and thereby discharge the stockings of different lengths into the particular receptacles provided for their collection.

12. A stocking sorting machine, according to claim 11, further including guide means for controlling the downward swing of the individual trays upon being released.

13. A stocking sorting machine, according to claim 11, further including means for restoring the studs on the trays to their normal retracted positions before the trays are again presented at the loading station.

14. A stocking sorting machine, according to claim 11, further including a stationary cam positioned along the lower return run of the conveyer for engaging the studs on the trays to restore the studs to their normal retracted positions before the trays are again presented at the loading station.

15. A stocking sorting machine, according to claim 11, wherein the withdrawing means for the filler elements include pressure fluid actuating cylinders with individually associated electrically-actuated control valves; and switches differently positioned along the machine and respectively in circuit with the electrically-actuated control valves, adapted to be closed by the differently positioned studs on the passing trays.

16. In a machine for sorting stockings according to the height of their reinforced heel areas, a driven conveyer upon which the stockings are transversely placed in succession and in definitely spaced relation with their heels all aligned longitudinally of the conveyer, at a feeding station at one end of the machine; a series of receivers arranged along the conveyer for reception respectively of stockings having heel areas of different heights; means adjacent the feeding station for sensing the height of the heel area of each passing stocking on the conveyer; a device at the region of placement of each stocking on the conveyer moved to a definite position in accordance with the height of the heel area of such stocking by the sensing means; and means at the locations of the respective receivers actuated by the devices differently positioned on the conveyer by the sensing means to effect transfer of the stockings with heel areas of corresponding heights to the particular receivers provided for their collection.

17. In a machine for sorting stockings according to the height of their reinforced heel areas, a conveyer comprising a pair of horizontally-arranged laterally-spaced chains trained about end sprocket wheels on transverse shafts; trays, for supporting individual stockings, each pivotally connected at its front end to the chains and each having a lateral projection at one of its rear corners; a series of receivers disposed longitudinally beneath the upper run of the conveyer for collection respectively of the stockings having heel areas of different heights; a track along the upper run of the conveyer over-ridden by the projection at the rear corner of each tray for temporary support of the tray in horizontal position, said track having voids at the locations of the respective receptacles; a normally-retracted stud shiftable on each tray in the direction of the length of the stocking placed thereon at a loading station at one end of the machine; automatic means for sensing the height of the heel area of each passing stocking and shifting the stud on such tray to a definite position according to the height of the heel area of the stocking; retractable filler elements normally occupying the voids in the track; and individually-associated means adapted to be actuated by the studs differently positioned on the trays to withdraw the filler elements for release of the trays to swing downwardly about their hinge connections with the chains and thereby discharge the different stockings into the particular receivers provided for their collection.

18. A stocking sorting machine, according to claim 17, further including guide means for controlling the downward swing of the individual trays upon being released.

19. A stocking sorting machine, according to claim 17, further including means for restoring the studs on the trays to their normal retracted positions before the trays are again presented at the loading station.

20. A stocking sorting machine, according to claim 17, further including a stationary cam positioned along the lower return run of the conveyer for engaging the studs on the trays to restore the studs to their normal retracted positions before the trays are again presented at the loading station.

21. A stocking sorting machine, according to claim 17, wherein the withdrawing means for the slides include pressure fluid actuating cylinders with individually-associated electrically-operable control valves; and switches differently positioned along the machine and respectively in circuit with the electrically-operable control valves, adapted to be closed by the differently positioned studs on the passing trays.

22. In a machine for sorting stockings according to the height of their reinforced heel areas, a moving conveyer comprising a pair of laterally-spaced horizontally-arranged endless chains; end wheels about which the chains are trained; a series of trays pivotally connected at their front edges to the chains each having a lug extending laterally from one of its rear corners; a horizontal supporting track for the upper runs of the chains upon which the lugs on the trays normally travel for maintenance of the trays normally in horizontal position, said track having voids in intervals spaced by a distance corresponding substantially to the spacing of the trays; a horizontally-arranged series of receivers respectively for stockings having heel areas of different heights, disposed longitudinally beneath the upper run of the conveyer in correspondence with the individual voids in the track; withdrawable slides normally closing the voids in the track; an electrically controlled actuating means for each slide; heel stops on the trays adjacent one side of the machine for definite placement of individual stockings upon the trays transversely of the machine as the trays arrive successively at a feeding station at one end of the machine; studs constrained to guides on the individual trays adjacent the regions occupied by the heel ends of the stockings so placed; a photo electric sensing eye on a normally retracted carriage movable back and forth over the conveyer in a transverse guideway adjacent the loading station; means for so moving the carriage as each tray arrives beneath it; means controlled by the eye as its beam encounters the top edge of the heel area of the stocking presented on each tray, to stop the carriage; means on the carriage for incidentally shifting the stud on the presented tray to a definite position on the tray in accordance with the height of the heel area of the stocking; and a series of differently positioned switches arranged along the machine and connected respectively in circuit with the electrically controlled actuating devices for the slides, adapted to be closed by the studs differently positioned on the different trays to effect withdrawal of corresponding slides as the lugs at the rear corners of the trays reach the voids in the track, whereby the trays are released to swing downward about their pivotal connections with the conveyer chains for discharge of the stockings with the different heel heights into the particular receivers provided for their collection.

23. A stocking sorting machine, according to claim 22, wherein the means for moving the photo electric eye-supporting carriage includes a pressure fluid cylinder with an electrically-operable control valve; and wherein a switch in circuit with the electrically-operable valve is closed through engagement by one of the front pivotal connections of each passing tray.

24. In a machine for sorting stockings according to length, a moving conveyer comprising a pair of transversely-spaced horizontally-arranged endless chains; end wheels about which the chains are trained; a series of trays pivotally connected at their front edges to the chains and each having a lateral projection at one of its rear corners; a series of receptacles disposed longitudinally beneath the upper run of the conveyer for collection respectively of stockings of different lengths; a track along the upper run of the conveyer over-travelled by the projections on the trays for temporary support of the trays in horizontal position, said track having voids at the locations of the respective receptacles; a normally retracted stud shiftable on each tray in the direction of the length of the stocking placed thereon at a loading station at one end of the machine; a photo-electric sensing eye on a normally-retracted carriage shiftable back and forth over the conveyer in a transverse guideway adjacent the loading station; means for so moving the carriage as each tray arrives beneath it; means controlled by the eye as its beam encounters the top edge of the stocking presented on each tray, to stop the carriage; means on the carriage for incidentally shifting the stud on the presented tray to a definite position on the tray in accordance with the length of the stocking; retractable filler elements normally occupying the voids in the track; and individually-associated means actuated by the studs differently positioned on the trays to withdraw the filler elements for release of the trays to swing downwardly about their hinge connections with the chains and discharge the different stockings into the particular receptacles provided for their collection.

25. A stocking sorting machine, according to claim 24, wherein the means for moving the photo-electric eye-supporting carriage includes a pressure fluid cylinder with an electrically-operable control valve; and wherein a switch in circuit with the electrically-operable valve is closed through engagement by one of the front pivotal connections of each passing tray.

26. In a machine for sorting articles differing in length, a driven endless conveyer; a series of transversely arranged trays upon which individual articles are placed with corresponding ends all aligned longitudinally of the conveyer at a feeding station, each tray being pivotally connected at one end to the conveyer and having a lateral projection at its opposite end; a series of receptacles disposed longitudinally beneath the upper run of the conveyer for collection of the articles of different lengths; a track along the upper run of the conveyer overtraveled by the projections on the trays for temporary support of the trays in horizontal position, each track having voids at the respective receptacles; a normally retracted stud shiftable on each tray in the direction of the length of the article placed thereon at the loading station; automatic means for sensing the length of each passing article and shifting the stud on the corresponding tray in accordance with the length of the article; retractable filler elements normally occupying the voids in the track; and individually-associated means adapted to be actuated by the studs differently positioned on the trays to withdraw the filler elements and thereby release the trays to swing downwardly about their pivotal connections with the conveyer for discharge of the articles of different lengths into the respective receptacles provided for their collection.

27. A sorting machine according to claim 26, further including guide means for controlling the downward swing of the individual trays upon being released.

28. A sorting machine, according to claim 26, further further including means for restoring the studs on the trays to their normal retracted positions before the trays are again presented at the loading station.

29. A sorting machine, according to claim 26, further including a stationary cam positioned along the lower run of the conveyer for engaging the studs to restore them to their normal retracted positions before the trays are again presented at the loading station.

30. A sorting machine, according to claim 26, wherein the withdrawing means for the filler elements include pressure fluid actuated cylinders with individually associated electrically-operable control valves; and switches differently positioned along the machine and respectively in circuit with the electrically-operable valves and adapted to be closed by the differently positioned studs on the passing trays.

31. In a machine of the character described for sorting articles, having different proportions; a horizontally moving conveyer upon which the articles are successively placed transversely and in spaced relation; a normally-retracted sensing means, including a photo-electric eye and a carriage therefor, mounted above and constrained to reciprocative movement transversely of the conveyer; means operative to advance the sensing means from its retracted position as each article underpasses it and to retract it immediately upon the light intensity hitting the photoelectric eye upon encountering a transverse line marking the beginning of an area of contrast; a plurality of stops mounted on the conveyer in spaced relation coincident with the spacing of the articles, each stop adapted to be moved into coincidence with the transverse line of its coincident article by the sensing means; a plurality of receptacles arranged along the conveyer for collection of differently proportioned articles; and means along the path of the conveyer respectively located adjacent the respective receptacles actuated by the differently positioned stops to effect transfer of the differently proportioned articles to the particular receivers provided for their collection.

32. In a machine of the character described for sorting articles, having differently proportioned characteristics; a horizontally moving conveyer upon which the articles are uniformly successively placed transversely and in spaced relation at a feeding station; a normally-retracted sensing means, including a photo-electric eye and a carriage therefor, constrained to reciprocative movement transversely across the conveyer; means operative to advance the sensing eye from its retracted position as each article underpasses it and to retract it immediately upon the light intensity hitting the photo-electric eye upon sensing the light reflected upon encountering a transverse line marking the beginning of an area of contrast; a stop on the sensing means adapted to be moved into coincidence with the transverse line on the article by said means; a series of receptacles arranged along the conveyer for collection of differently proportioned articles; and means along the path of the conveyer respectively located adjacent the respective receptacles actuated by stops differently positioned on the conveyer by the sensing means to effect transfer of the differently proportioned articles to the particular receivers provided for their collection.

33. In a machine for sorting stockings differing in length, a driven conveyer upon which flattened out stockings are placed crosswise in succession and in spaced relation at a feeding station with corresponding ends of the stockings all aligned longitudinally of the conveyer; a series of receivers arranged at intervals along the path of the conveyer for reception of stockings of the different lengths; photo electric scanning means; means for reciprocating the scanning means transversely of the conveyer to sense the lengths of the stockings as they are advanced on the conveyer; and means along the path of the conveyer controlled from the scanning means to effect transfer of stockings of like lengths to the particular receivers provided for their collection.

34. In a machine for sorting stockings differing in length and in the height of their reinforced heel areas, a driven conveyer upon which flattened out stockings are placed crosswise in succession and in spaced relation at a feeding station with their heels all aligned longitudinally of the conveyer, at a feeding station; a series of receivers arranged at intervals along the path of the conveyer for reception respectively of different stockings of the same lengths and heel heights; scanning means respectively for sensing the stockings for length and for sensing the heel heights of the stockings; means for reciprocating the scanning means transversely of the conveyer to sense the lengths of the stockings and their heel heights as the stockings are advanced on the conveyer; and means along the path of the conveyer controlled from the scanning means to effect transfer of different stockings of like length and heel height to the particular receivers provided for their collection.

35. In a machine for sorting stockings differing in length and in the height of their reinforced heel areas, a driven conveyer upon which flattened out stocking are placed crosswise in succession and in spaced relation at a feeding station with their heels all aligned longitudinally of the conveyer; a series of receivers arranged at intervals along the path of the conveyer for reception respectively of different stockings of the same lengths and heel heights; photo-electric scanning means respectively for sensing the length and heel heights of the stockings; means for reciprocating the scanning means transversely of the conveyer to sense the length of the stockings and their heel heights as the stockings are advanced on the conveyer; and means along the path of the conveyer controlled from the scanning means to effect transfer of stockings of like length and heel height to the particular receivers provided for their collection.

References Cited in the file of this patent

UNITED STATES PATENTS

| | | |
|---|---|---|
| 1,626,359 | Rundell | Apr. 26, 1927 |
| 1,633,002 | Cutler | June 21, 1927 |
| 1,846,808 | Hohn et al. | Feb. 23, 1932 |
| 2,020,925 | Young | Nov. 12, 1935 |
| 2,315,287 | Hollaway | Mar. 30, 1943 |
| 2,346,583 | Jackson | Apr. 11, 1944 |
| 2,612,994 | Woodland | Oct. 7, 1952 |